United States Patent
Scarnato et al.

[15] 3,683,602
[45] Aug. 15, 1972

[54] CROP AERATING MECHANISM FOR HARVESTERS

[72] Inventors: Thomas J. Scarnato, Barrington; Peter J. Peacock, Western Springs; George B. Cicci, Broadview; Paul W. Krage, Elmhurst; John J. Kowalik, Glenview, all of Ill.

[73] Assignee: International Harvester Company, Chicago, Ill.

[22] Filed: Dec. 16, 1970

[21] Appl. No.: 98,497

[52] U.S. Cl.....................56/14.4, 56/DIG. 1, 56/192
[51] Int. Cl. .............................................A01d 43/10
[58] Field of Search......56/1, DIG. 1, 14.5, 192, 14.1, 56/14.2, 372, 153

[56] References Cited

UNITED STATES PATENTS

| | | | |
|---|---|---|---|
| 2,915,869 | 12/1959 | Coultas | 56/DIG. 1 |
| 2,918,774 | 12/1959 | McCarty | 56/DIG. 1 |
| 3,118,264 | 1/1964 | Barnes | 56/DIG. 1 |
| 3,225,531 | 12/1965 | Van der Lely | 56/372 |
| 3,241,300 | 3/1966 | Fell et al. | 56/153 |
| 3,543,491 | 12/1970 | Lausch | 56/192 |

FOREIGN PATENTS OR APPLICATIONS

377,138  6/1964  Switzerland............56/DIG. 1

Primary Examiner—Russell R. Kinsey
Attorney—Floyd B. Harman

[57] ABSTRACT

A crop aerating device comprising a bar with spaced fingers positioned transversely of the side sheets of a windrowing mechanism for intercepting crops discharging from a pair of crop conditioning rolls, the fingers functioning to deflect some of the crops downwardly to form a first swath layer and allowing some of the crops to pass between the fingers while retarding the same so as to drop in a second layer on top of the first, some of the crops passing through passages between the ends of the aerating bar and the windrow side sheets which sheets are contoured at their rear ends to form pans which cause the crop thereon to slide and fold inwardly and form a third layer onto the second layer. A method of forming a swath by a multi-layer confluence of crops is also disclosed.

25 Claims, 24 Drawing Figures

INVENTORS
THOMAS J. SCARNATO
PETER J. PEACOCK
GEORGE B. CICCI
PAUL W. KRAGE
JOHN J. KOWALIK

BY John J. Kowalik ATT'Y.

CROP AERATING MECHANISM FOR HARVESTERS

DISCUSSION OF THE PRIOR ART

The prior art has heretofore used behind the conditioning rolls a solid panel swath board which sheds all of the crops therebeneath in a clumped, single layered swath. In light crops a pronounced "step ladder" effect obtains in which the crop is discharged in bunches with empty spaces in between. The crops are clumped and matted after being squeezed between the conditioning rollers and in being thrown against a solid sheet are poorly separated. This poor spread of the material and poor distribution increases the drying time and at times, deteriously affects the quality of the resulting product.

SUMMARY OF THE INVENTION

This invention is directed to a novel device for forming a loose and airy multi-layer swath.

A broad object of the invention is to provide means for fluffing the matted stream of conditioned crops and branching the stream into a plurality of flows which then are aggregated into a light multi-layered swath.

The invention is particularly adaptable in light crops to eliminate the so-called "step ladder" effect by distributing the crops more evenly upon the stubble in the field.

The invention provides for more uniform drying thus preventing overdrying of some of the crops and underdrying of other crops to an extent wherein the nutritious leaves are flaked off the branches in a subsequent raking and baling operation or the crops are spoiled in by compacting in pockets.

A still further object is to provide a novel method of forming a swath by first separating the stream of material into a plurality of flows and then aggregating them in a multi-layered swath.

The invention comprehends a concept of directing a portion of the material downwardly and passing substantial portions of the crop through the baffle means and around the ends of said baffle means for guidance by the side sheets into a consolidated fluffy swath.

These and other objects and advantages inherent in and encompassed by the invention will become more readily apparent from the specification and the drawings, wherein:

FIGS. 17–19 illustrate a further embodiment.

FIGS. 20–23 illustrate still another embodiment.

DESCRIPTION OF THE EMBODIMENT OF FIGS. 1–6

Having particular reference to the drawings, there is shown a harvesting implement generally designated 2 commonly known as a mower conditioner although it will be readily understood that the invention is equally applicable to hay conditioners as such.

The mower conditioner shown comprises a main frame structure 3 upon which is carried a sub-frame 4 of a header generally designated 5 which is pivoted on a transverse substantially horizontal axis as at 6 from the main frame 3 and comprises a side member 7 at each side. Each member has an upwardly extending anchor 8 connected to the forward end 9 of a counterbalancing spring 10 which, at its rear end, is connected as at 11 to an anchor 12 mounted on the main frame 3. The header comprises an upwardly and rearwardly extending transverse platform 13 which extends between the side members 7 and is connected therewith. The platform mounts at its forward edge a mower 14 which is adapted to cut the standing crops shown at 15 as such crops are swept thereto by a reel 16 by means of the spring fingers 17 carried thereon. The reel is rotatably mounted on journals from side members 7, as is well known to those skilled in the art. The fingers 17 are arranged to sweep over the top surface 22 of the deck 13 and to project the material upwardly and rearwardly after it is cut by the mower 14 into upper and lower hay conditioning rollers 24 and 25, the rollers rotating in the direction shown by the arrows in FIG. 1 and discharging the conditioned crop in a wide stream shown at 26 since the rollers 24 and 25 are substantially a width as wide as the reel 16 and the platform 13.

Figure 1:
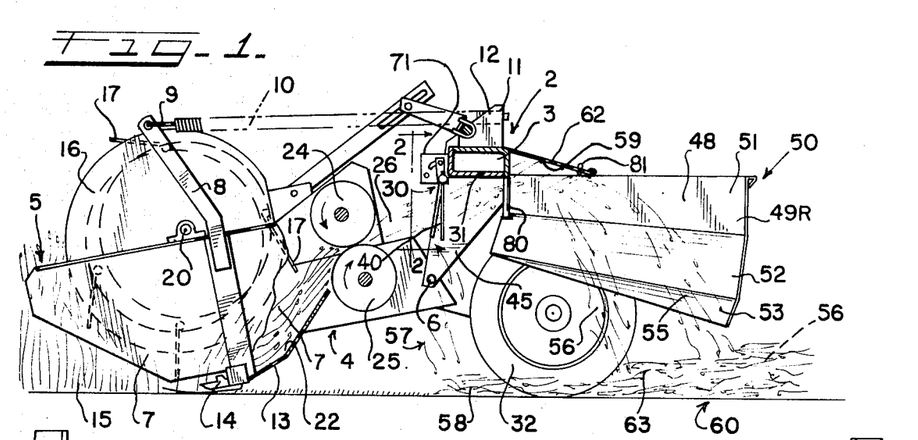
FIG. 1 is a longitudinal sectional view of a mower-conditioner, incorporating one embodiment of the invention.

This stream of material impinges against the novel aerating bar generally designated 30 which is positioned ahead of the transverse beam 31 of the frame 3 of the basic structure which is carried on laterally spaced wheels 32, one wheel 32 being positioned at each side of the unit.

Figure 2:
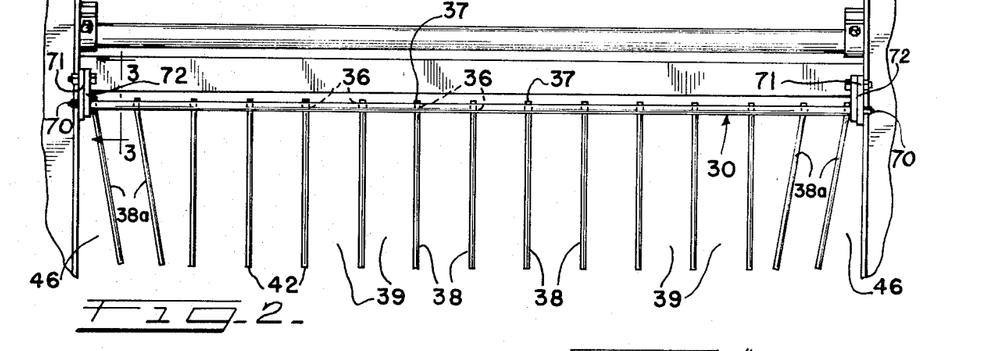
FIG. 2 is an enlarged sectional view taken on line 2—2 of FIG. 1.
Figure 5:
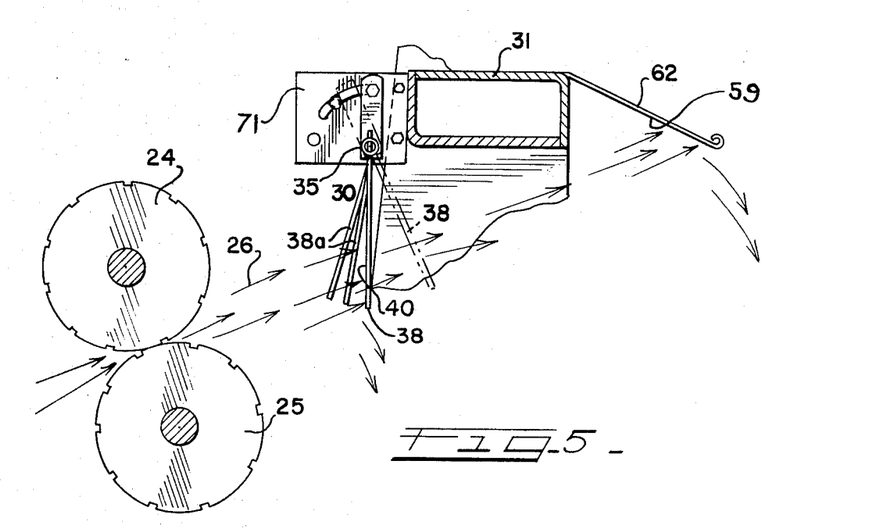
FIG. 5 is an enlarged fragmentary sectional view comparable to FIG. 1 showing the aerating bar in position.
Figure 6:
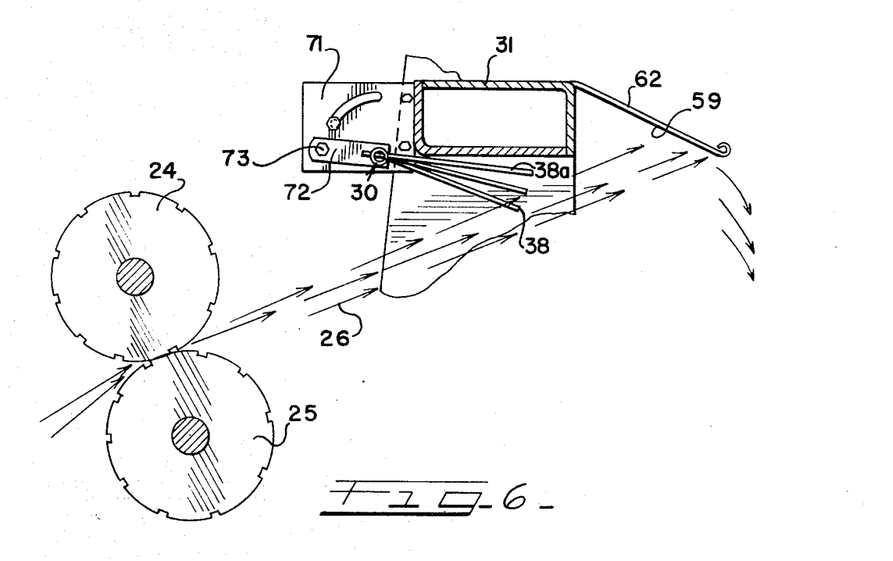
FIG. 6 is a view similar to FIG. 5 showing the tines in elevated locked-out position.

The aerating bar 30 is positioned athwart the stream of material shown at 26 which is discharged from the rollers 24 and 25 at relatively high velocity and comprises a tubular bar element 35 which has a series of longitudinally spaced vertical apertures therethrough indicated at 36 through which extend root or upper ends 37 of tines 38 which are preferably of thin round resilient wire such as spring steel or the like. Preferably these tines are spaced on the order of about 10 inches apart to provide passageways 39 therebetween. The forward sides of the tines provide impingement surfaces as at 40. The lower ends of these tines shown at 42 are free and unsupported in order to shed the crops readily and the end tines 38a facing opposite ends of the bar are preferably angled laterally inwardly as best seen in FIG. 2 and are also sloped or angled forwardly as shown in FIGS. 5 and 6. The end tines 38a are preferably spaced 6 inches apart and with the adjacent pedestals or guides 45, which serve as anchors for the rear ends of the panels 7 of the header frame, form passageways as at 46 with the ends of the aerating bar to permit the volume of crops at the ends of the rollers to pass therethrough and then course along the interior surfaces 48 of side panels 49R, 49L of the windrowing means generally designated 50. (FIG. 7) The windrowing means 50 is common to all of the embodiments.

Figure 7:
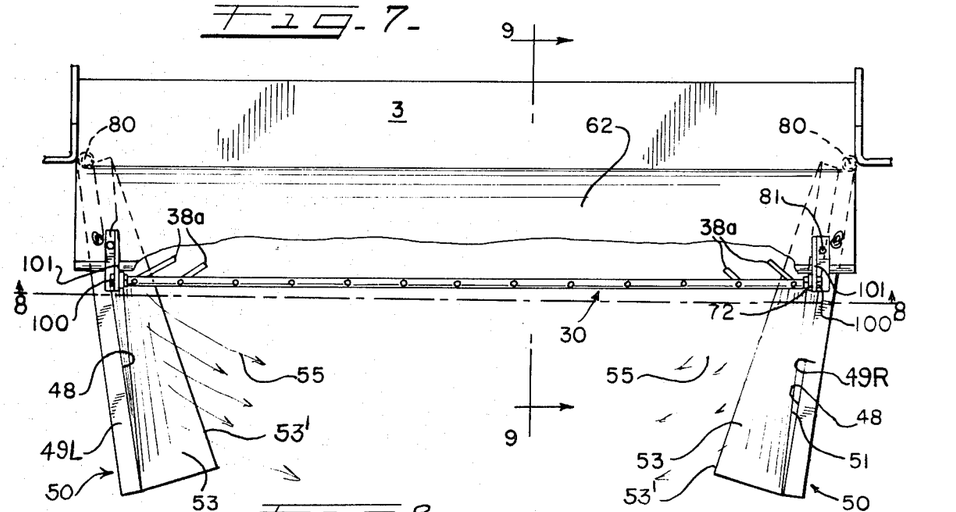
FIG. 7 is a fragmentary top view partly broken away of another embodiment of the invention.
Figure 8:
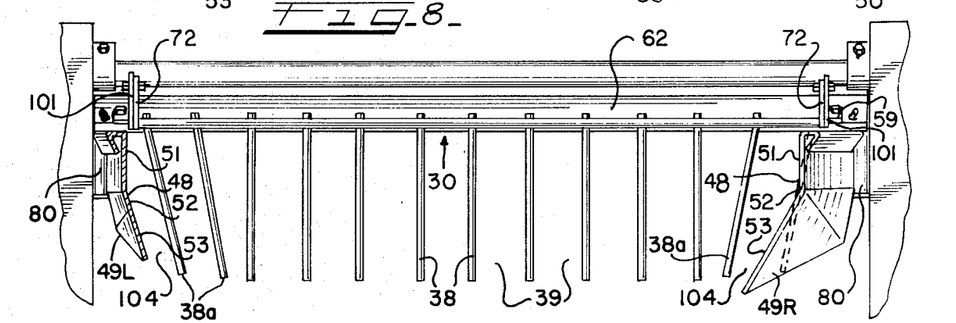
FIG. 8 is a sectional view taken substantially on line 8—8 of FIG. 7.
Figures 10, 11, 13:
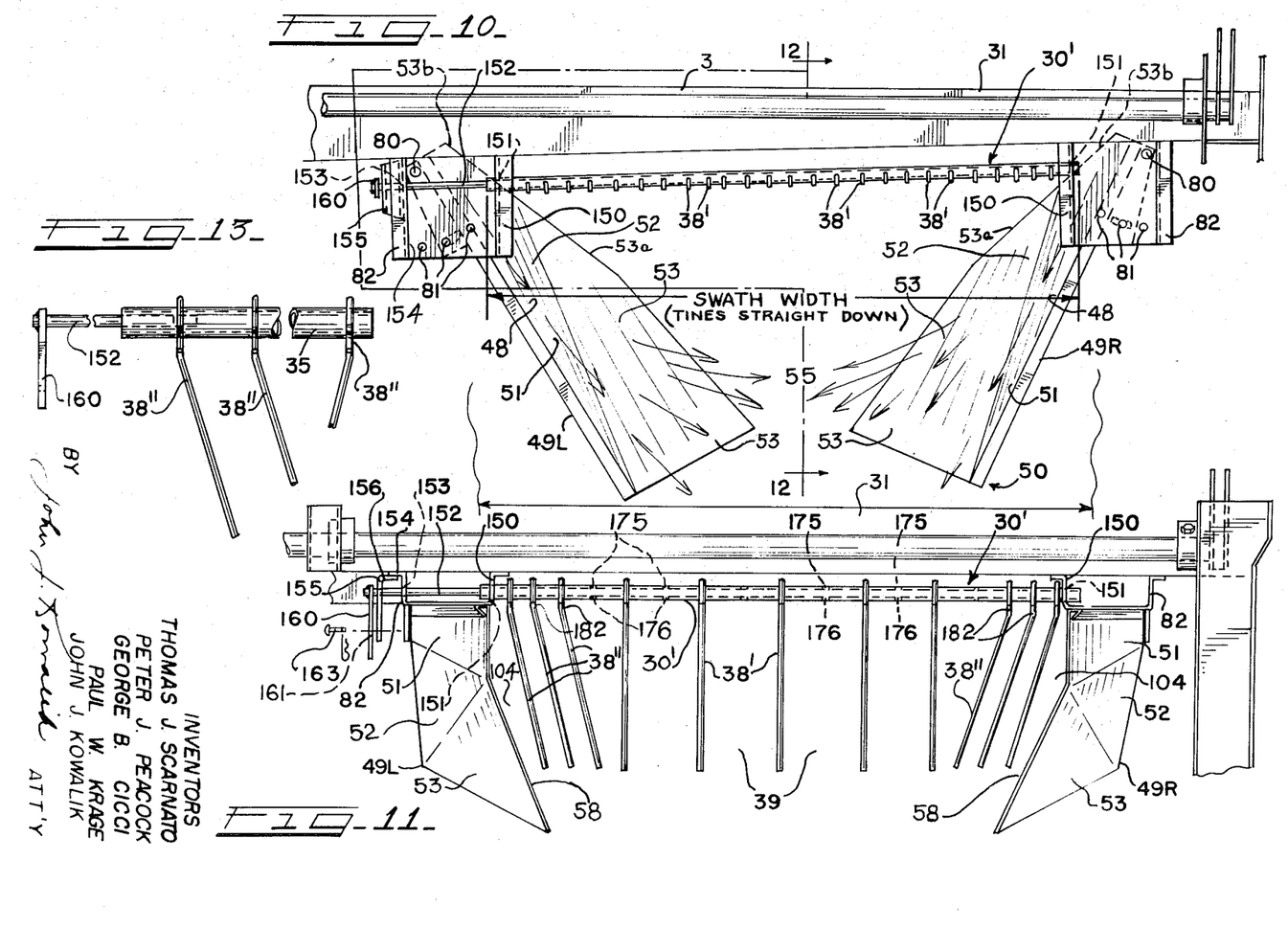
FIG. 10 is a fragmentary top plan view of still another embodiment of the invention.
FIG. 11 is a rear view of the structure shown in FIG. 10.
FIG. 13 is a broken apart rear elevational view of the bar shown in FIGS. 10–12.

Either the panels 49R and 49L of FIG. 7 or FIG. 10 may be used since the bar 30 is ahead of them. As best seen in FIGS. 7 and 8 these side panels 49R, 49L each comprise a substantially vertical upper portion or section 51 and an inwardly sloping intermediate portion or section 52 and a more abruptly inwardly sloping lower or pan portion 53. As the bar is angled upwardly, the swath becomes narrower since the pan portions 53 become wider and wider toward the rear. The function of these portions 51 through 53 is to guide the material coursing therealong which exits through the passageways 46 to fold such material as seen at 55 as a top layer 56 of the swath generally designated 60. It will be observed that the stream of material shown at 26 divides into three branches or flows 55, 56 and 57 and that the portion of the material 57 forms the first layer 58 laying on the stubble in the field. This portion of the material impinges against the forward sides of the teeth 38 and is directed downwardly at 57 and being the forwardmost branch will drop to the ground first. The second branch of flow indicated at 56 consists of material which passes through the spaces 39 between the teeth and rebounds as at 59 against the underside of the top deflector shield 62 of the windrow mechanism 50. This sheet 62 extends diagonally downwardly and rearwardly from the rear side of the member 31. The branch or portion of the material indicated at 56 drops and forms the second layer 63 of the swath. Thus the aerator 30 not only deflects the material, but breaks up the material and with the windrowing panels divides the material into a plurality of streams which are integrated into a multi-layered swath.

Figure 3:
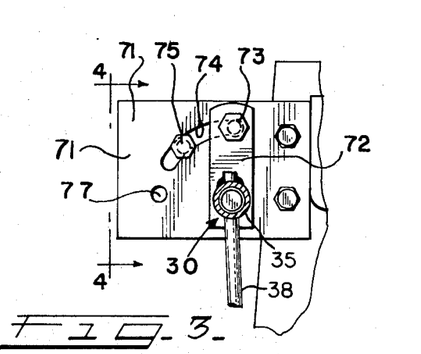
FIG. 3 is a sectional view taken essentially on line 3—3 of FIG. 2.
Figure 4:
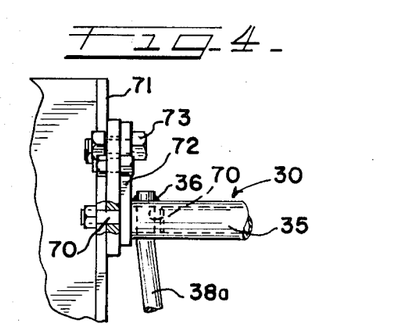
FIG. 4 is a view taken on line 4—4 of FIG. 3.

The tubular portion 35 of the aerator bar 30 is provided at each end with a pin 70 which is pivoted on a substantial horizontal axis to a bracket 71 suitably secured to the adjacent portion of the forward side of the member 31. The bar is provided at one end with an arm 72 (FIGS. 3 and 4) united therewith and this bar carries a combination stop and locking device 73 which operates in an arcuate slot 74 formed in the bracket 71. In this embodiment of the invention, the aerating bar 30 or assembly is pivotal within the limits of the slot 74. The forward limit of swing of the arm 72 and thus the bar may be controlled by an adjustable stop 75 in the form of a bolt which may be clamped to opposite sides of the bracket 71 through the slot 74 and secured thereto. It will be apparent that varying volumes of material and the velocity of the material as well as the type of material will cause the bar to deflect rearwardly different amounts and to pendulate and thus aid the bar to rake through the material and fluff the same. As best seen in FIG. 6, the aerator bar assembly 30 is shown in its locked-out position wherein the arm 72 is connected by the bolt 73 to the bracket 71 through the aperture 77 as best seen in FIG. 3. In this position the trajectory of material 26 is directly against the underside 59 of the top deflector shield or plate 62 and the material cascades downwardly between the side panels 49R, 49L of the windrower wherein as seen in FIG. 7 the pan portions 53 taper gradually forwardly at edge 53. The structure of the panels 49 of FIG. 10 may be used herein if desired. These side sheets are adjusted inwardly and outwardly about the pivots 80 connected at their forward ends and to the rear side of the member 31 therebelow. The adjustment of the windrow sheets is conventional in that these sheets are secured in any of a plurality of apertures 81 of the rear extension structures 82.

EMBODIMENT OF FIGS. 7–9

Figure 9:
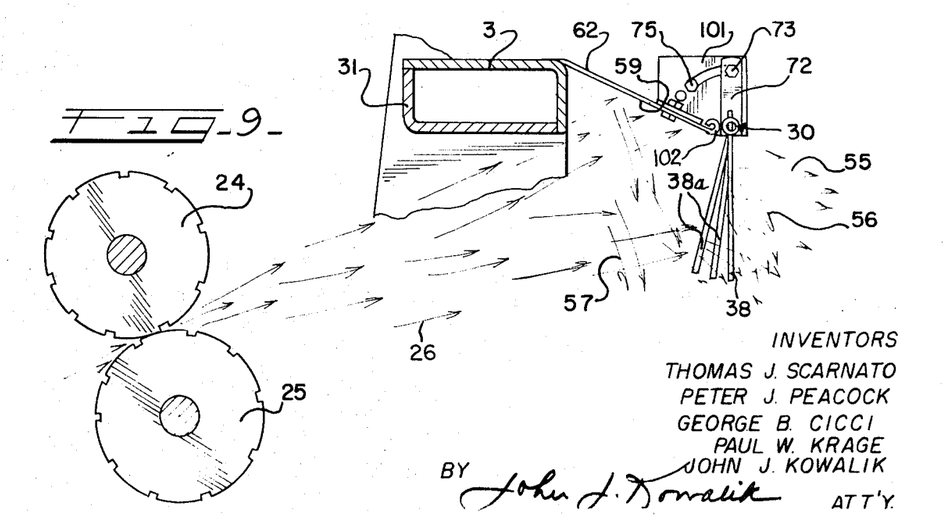
FIG. 9 is a sectional view taken substantially on line 9—9 of FIG. 7.

Referring now to the embodiment of the invention, as shown in FIGS. 7 through 9, parts which are identical with the previous embodiment are identified with the same reference characters. In this embodiment the aerator bar assembly 30 is pivotally hung at opposite ends as at 100 from a pair of brackets 101 from the top of the deflector shield 62 adjacent to its rear end 102. As in the previous embodiment, the bar assembly 30 is provided with an arm 72 and a stop and locking bolt 73 as well as the abutment stop bolt 75 which is adjustable to control the swing of the assembly 30. In this embodiment, a portion of the cut material impinges against the underside 59 of the top projector shield and drops downwardly. Some of the crop is directed rearwardly and the lower portion of the stream impinges against the fingers 38 and drops into a first layer 57 with whatever crop drops down directly from the underside of the top shield 62. Some of the crop as at 56 passes through the spaces 39 and forms a second layer as in the previous embodiment and the remainder of the crop as at 55 moves through the passages 104 (FIG. 8) between the interior sides 48 of the side plates 49 and the end fingers of the bar which are angled inwardly and forwardly slide off the portions 53 of the side sheets and forms the third layer. In this embodiment the aerator bar assembly 30 is also preferably free-swinging, but can be locked in a plurality of angular positions.

In certain crop conditions, depending upon the length of the crop, density, etc., the bulk thereof such as in long stem material, the arrangement of FIGS. 7–9 would be advisable in positioning the aerator bar further away from the rollers than in the previous embodiment, where the bar 30 is close, to prevent plugging or bunching.

EMBODIMENT OF FIGS. 10–16

Figures 12, 14, 15, 16:
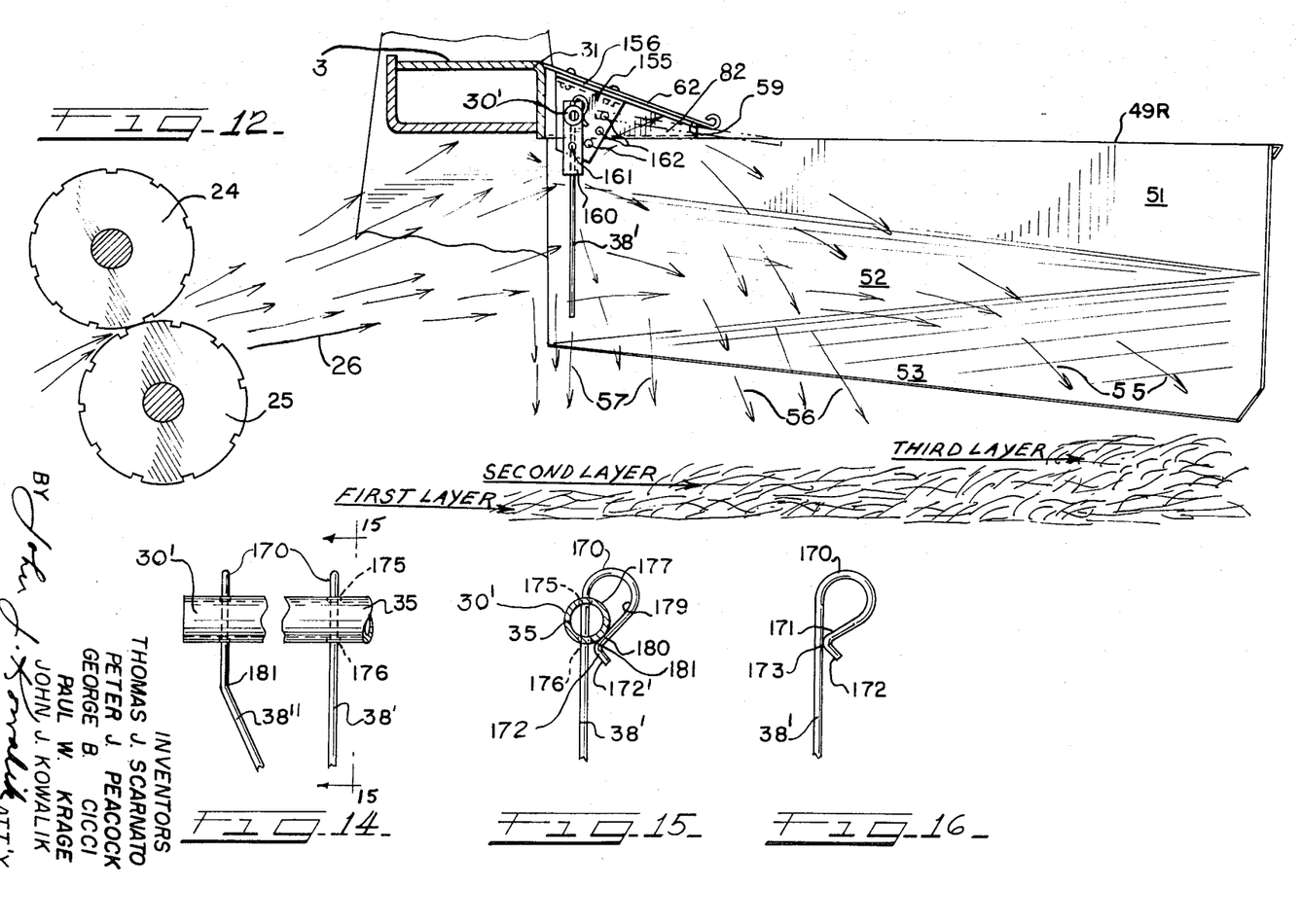
FIG. 12 is a cross-sectional view taken substantially on line 12—12 of FIG. 10 showing the bar of FIGS. 14–16.
FIG. 14 is a fragmentary broken apart front elevational view of aerating bar of FIGS. 10–12.
FIG. 15 is a cross-sectional view of the structure of FIG. 14 taken substantially on line 15–15 of FIG. 14.
FIG. 16 is a side elevational view of the removable tine utilized in the embodiment of FIG. 12.

Referring now to the embodiment shown in FIGS. 10 through 16 it will be understood that the general configuration of the harvester is similar to that shown in the previous embodiment and similar parts are thus identified with the same reference numerals. The placement of the aerator bar assembly generally designated 30', however, is immediately behind the beam 31 adjacent to the forward ends of the side panels 49R, 49L of the windrowing apparatus 50. In this embodiment the bracket structures 82 provide pivotable support on their inner gussets 150 for the bar or tubular element 35 which has its ends passed through suitable apertures 151 therein. The left end of the bar is connected to a shaft 152 which extends through an aperture 153 in the other gusset 154 of the left member 82 and through a locking plate 155 which is suitably secured to the adjacent bracket flange 156. The outer end of the shaft 152 is connected, preferably as by welding, to arm 160 which may have an aperture 161 alignable with any of the series of apertures 162 in the locking plate 155 whereat it may be positively locked by means of a pin and key assembly 163. In this embodiment the end fingers 38" are angled inwardly and the intermediate fingers 38' are positioned vertically. In view of the position of the bar 30', similar to bar 30, the windrow panels 49L, 49R may be adjusted to control the width of the swath in this embodiment. The fingers designated 38' are formed at their upper ends with a loop 170 which is closed in the relaxed position as shown in FIG. 16. The inclination of the leg 171 of the loop is toward the tine 38' and the end of the leg 171 merges with an outwardly directed lug 172 at the juncture forming a cam lobe 173 which serves to open the loop attendant to the finger portion 38" being extended through vertically aligned apertures 175, 176 in the tube 35 and forcing the tine downwardly whereupon the lower surface 172' of the lug 172 cams on the arcuate periphery 177 of the tube and causes the loop to open and then the leg 171 snaps behind the tube 35 and has its inner side 179 engaging as at 180 with the rear portion of the tube 35 adjacent to its bottom side 181. Thus it will be seen that the fingers are readily removable and insertable into any of a plurality of apertures 175, 176 so as to vary the population density of the fingers in different areas. The fingers 38' are shown closely spaced in FIG. 10 and widely in FIG. 11. As best seen in FIG. 11 of this embodiment the end fingers 38" are angled or more closely spaced than the fingers 38' in the intermediate portion of the bar 30'. It will be understood that the fingers 38" are flexible and therefore, even though fingers 38" are bent as at 182, they will straighten out to pass through the respective apertures 175, 176.

In this embodiment as in the previous embodiment, some of the crop impinging against the forward side of the tines will be deflected downwardly to form the first layer. The portions 53 of the side panels 49R, 49L are cut diagonally at 53a, 53a and narrow toward their forward ends 53b to clear the endmost tines of the bar 30' whereby in the lowered position the crop will drop directly downwardly from the ends of the bar 30' without obstruction by pans 53 to form a full width swath. The crops that pass through the tines will impinge against the underside 59 of the top plate 62 and the remainder of the crop will move through the passages 104 between the end tines and the inner sides of the respective side panels and will course along the surfaces of portions 51, 52, 53 and will fold in forming the third layer. As the bar 30' is angled upwardly the swath becomes narrower since the material then moves farther along portions 53 before it drops off particularly if the panels 49R, 49L. are converged rearwardly.

In each embodiment a multi-layered effect is achieved and in each instance the aerating bar may be positioned upwardly to an inoperative position whereby the material can be condensed into a windrow by the side sheets 49R, 49L. It will be observed that a novel method of forming a swath is provided which comprises producing a high velocity stream of material of swath width, then causing some of the material, while raking through the material and fluffing it, to drop in a first layer, passing some of the material behind the first portion to drop in a second layer upon the first layer and then folding the material or gathering the material at the lateral extremes of the swath and folding it onto the second material in order to form a third layer.

This apparatus has been actually tested and has been found to function in the manner indicated providing multi-layered effect to minimize or entirely eliminate the "step ladder" effect previously obtained and as is inherent in the solid swath plate structure.

EMBODIMENT OF FIGS. 17–19

Figure 17:
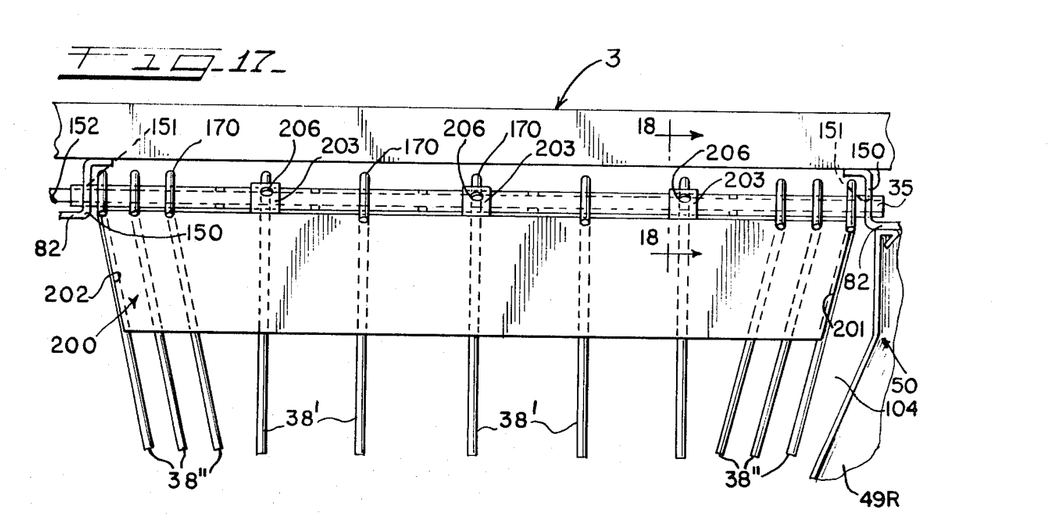
FIG. 17 being a fragmentary rear view.
Figure 18:
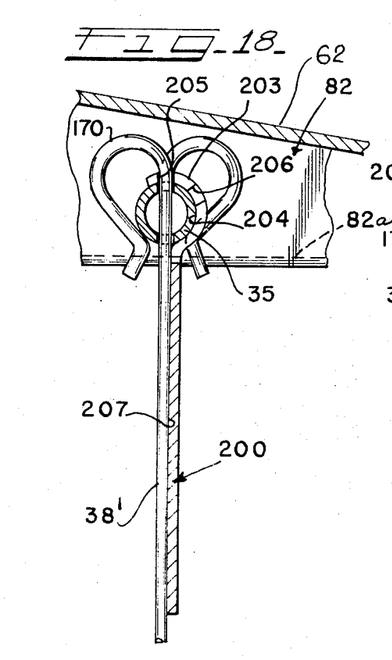
FIG. 18 being an enlarged cross-sectional view showing one position of the parts taken substantially on line 18–18 of FIG. 17.
Figures 19, 19A:
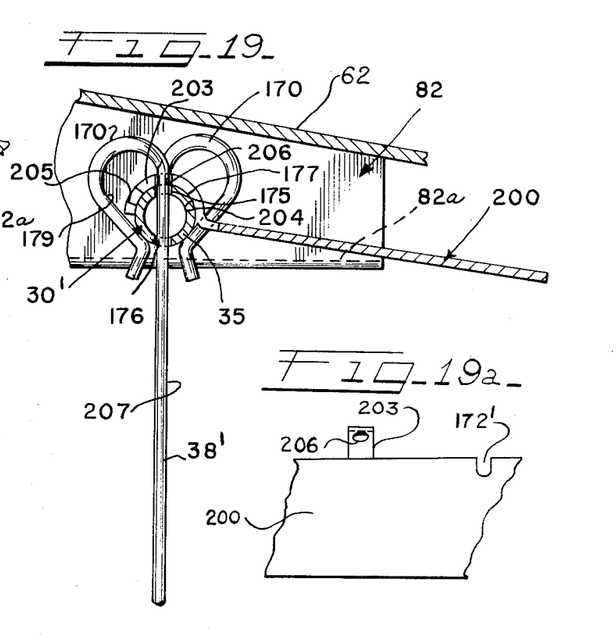
FIG. 19 being a cross-sectional view similar to FIG. 18 showing the parts in another position.
FIG. 19a is a fragmentary rear view of the plate.

In the embodiment of FIGS. 17–19, parts common to the other embodiments are identified with the same reference numerals. In this arrangement the spaces between the fingers are partially blocked off by a plate or baffle 200 which extends the full length of the bar from the end finger at one end of the bar 30' to the end finger on the other end and has end edges 201, 202 sheared diagonally in accordance with the inclination of the respective end fingers. The plate is provided with upper edge lug portions 203 which are arcuately contoured to conform to the periphery 177 of pipe or shaft 35 and have a cupping concavity 204 admitting a portion of the pipe therein.

In this instance the portions 203 are each provided with circumferentially spaced apertures 205, 206. As shown in FIGS. 17 and 18, the fingers 38' aligned with the lugs are extended through the apertures 205 and bar apertures 175, 176 aligned therewith thus holding the plate portion vertically against the back sides 207 of the fingers 38'. It will be observed that the fingers which pass through the lugs are positioned with their upper loop portion 170 extended forwardly of the bar 35 thus accommodating swinging the baffle plate to a raised position as shown in FIG. 19 upon removal of the fingers extending through lugs 203. In the raised position the respective fingers 38' then are passed through apertures 206, 175, and 176.

In the lowered position, the baffle has an extent preferably 4 inches in depth from the pipe and the fingers are 11 ½ inches from the bottom of the pipe. Thus about 7 ½ inches of tine is exposed below the baffle. The straight fingers on all of the embodiments shown are preferably spaced 10 inches apart and the bent fingers at their lower ends are preferably spaced about 6 inches apart.

The function of the baffle is to provide a stop for certain material such as "Sudex" for example. It has been observed from tests that such crop materials discharge from the rollers such as spears and the bulk of the stalks pass through the passages between the fingers so that they fall in parallel lays and form a compact mass which inhibits drying. By providing the baffle, the flow of such material is dramatically changed in that the upper strata of the band of material discharging from the rollers hits endwise against the baffle sheet causing the spear-like stalks to crumple and fall through the lower strata. This cascading mass of material forms a loose barrier which causes additional material to fold and drop therewith. Other portions of such crop material in the lower strata pass through the portions of the passages beneath the lower edge of the panel. Certain portions also pass between the ends of the panel and the windrow sheets in the passages 104, 104 as described in the previous embodiments.

EMBODIMENT OF FIGS. 20–22

Figures 20, 21, 22, 23:
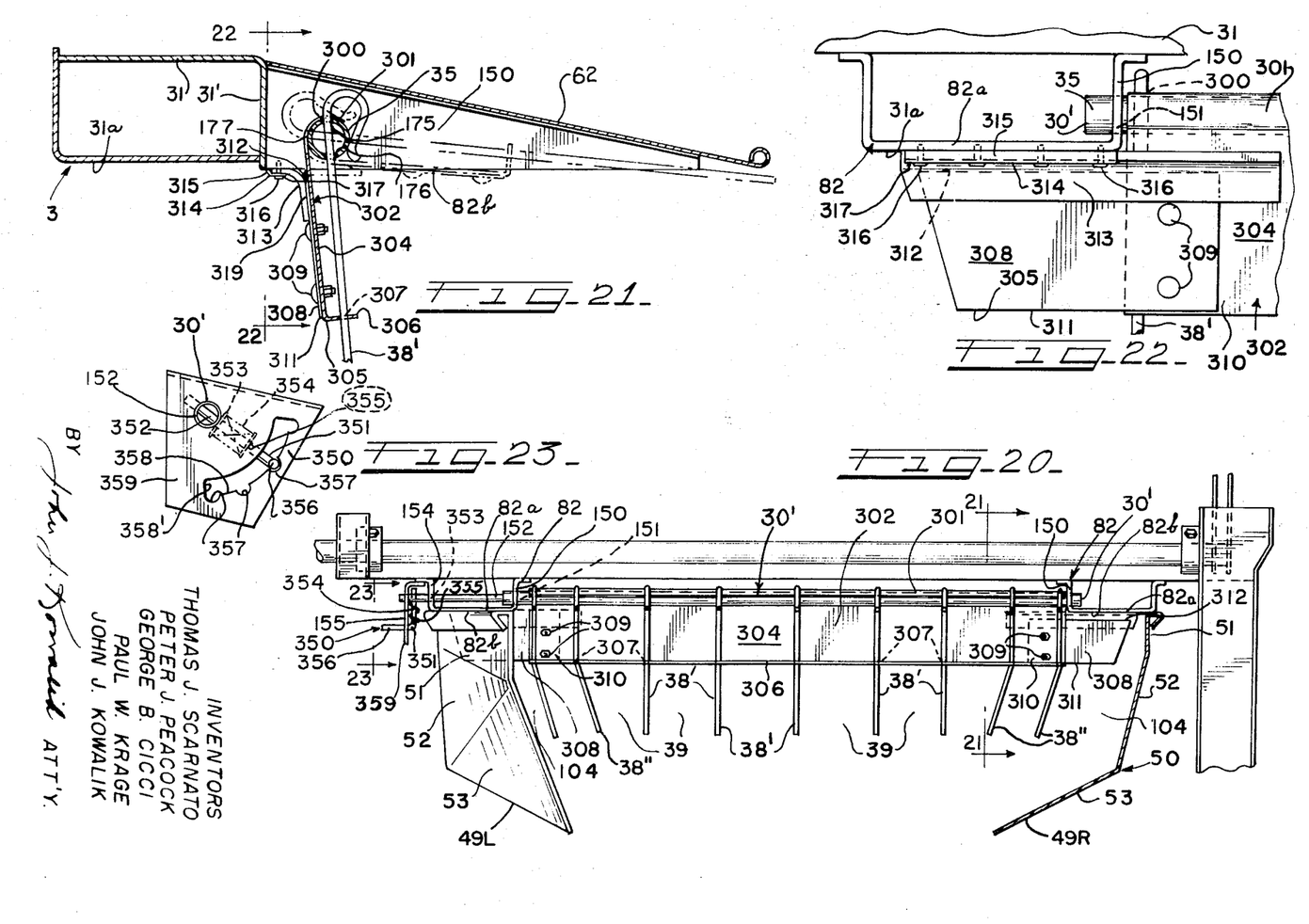
FIG. 20 is a rear view thereof with parts shown in section.
FIG. 21 is an enlarged cross-sectional view taken substantially on line 21—21 of FIG. 20.
FIG. 22 is a fragmentary front view taken substantially on line 22–22 of FIG. 21.
FIG. 23 is an enlarged side elevational view of the latching mechanism taken substantially on line 23—23 of FIG. 20.

In this embodiment, parts common with the other embodiments are identified with the same reference numerals. The aerator bar 30' is positioned behind the rear wall 31' of the transverse beam 31 at a level above the bottom substantially horizontal surface 31a of the beam and has its end portions passed through journal openings 151, 151 in the vertical inboard flanges 150 of the brackets 82 which extend rearwardly of the beam 31 and attached to wall 31'. Each bracket has a bottom wall 82a with a lower face 82b substantially coplanar with the surface 31a of beam 31.

In this embodiment the teeth or tines or fingers 38' each extend through apertures 300 in an arcuate flange 301 formed on the upper edge of a baffle panel 302. The flange is complemental to the periphery 177 of the pipe 35 and the fingers 38' extend through respective apertures 300 and aligned apertures 175, 176 in the pipe 35 and thus hold the upper portion of the plate 302 in place.

The plate or panel 302 has a flat body portion 304 disposed in front of the tines and shields the upper portions thereof. The effective depth from the bottom of the pipe or tube 35 to the lower edge 305 of the plate is about 4 inches. The lower edge of the plate is formed with a rearwardly bent flange 306 which has apertures 307 therein aligned with respective fingers 38" which extend therethrough. The lower portions of these fingers below the plate extend about 7 inches. They are preferably spaced apart on the order of that recited in the previous embodiment. It will be understood that under some circumstances it may be necessary in each embodiment to change such spacing between the fingers due to crop conditions. However, for all around use, the foregoing spacing has been found to give excellent results.

In this embodiment, end plates 308 are bolted at 309 to the respective ends 310 of the center baffle body 304. These plates are inserted when a full width swath is desired and have a lower edge 311 substantially coplanar with the lower edge of the panel 304.

The upper edges 312 of these end plates 308 are disposed proximate to the lower surfaces 82b of the respective brackets.

Forwardly of these panels 308 there are provided flat, fiber impregnated rubber or elastomer flaps 313 which at their upper edges are secured to the undersides of the bottom walls 82a of respective brackets 82. Under each flap a metal retainer 314 is underposed, the retainer having a forward flange 315 sloping upwardly and forwardly and contacting at its forward edge against the bottom side 82b of the respective wall 82a. Screws 316 are threaded through apertures in the horizontal rear plate portion 317 of the retainer and in the flap into appropriate threaded apertures in the respective wall 82a.

As best seen in FIG. 21, each flap 313 is deflected downwardly against the forward side 319 of the respective end plate 308 to guide the material downwardly.

As best seen in broken lines in FIG. 21, each flap 313 straightens out in its relaxed position and lays under the respective end plate portion 308 when the aerator is folded upwardly. It will be appreciated that in this embodiment as well as in all of the others, the aerator is positionable from a substantially vertical disposition at various increments of rearwardly sloping adjustment to a substantially horizontal position. In the vertical position a full width swath is obtained.

In the embodiments of FIGS. 1–6, since the aerator is in front of the windrow sheets, the crops drop off to a full width with the aerator down. In the remaining embodiments, the forward portions of the pans are cut away at 53a, 53a (FIG. 10) whereby the side panels 49R, 49L may be adjusted inwardly as best seen in FIGS. 7 and 10 and even with such adjustment of the side panels a full width windrow will form. The advantage of this construction becomes apparent upon adjustment of the aerator upwardly. The crops are then permitted to traverse over different widening portions of the bottom pans 53 of the windrow sheets which reduce the windrow width. Such an arrangement is particularly desirable in that the side sheets may be adjusted once and by only positioning the aerator bar at a desired disposition, the width and the composition of the formation of the material can be varied from a full swath through a narrowed swath to a condensed windrow without the necessity of any additional adjustment of the windrow sheets. Thus the width of the swath may be correlated with the spacing of the tractor wheels to eliminate or minimize running over the crops at the side edges of the swath.

In this embodiment a form of latch designated 350 is different from the other embodiments and comprises an L-shaped bolt 351 having one leg 352 extending through an aperture 353 in shaft portion 152 of the aerator bar and is spring loaded by a spring 354 compressed between the shaft portion 152 and an abutment pin 355 extending through leg 352 thus urging leg 352 outwardly and engaging the other leg 356 of the bolt in any of a series of selected notches 357 formed in one edge 358 of an arcuate slot 358 formed in a locking plate 359 which is secured to flange 154 of the bracket 82. The bolt is released from any notch by the operator grasping leg 356 and urging it out of the respective notch against the compression of spring 354 and then the operator swings the bolt with the aerator bar 30' to any adjusted position and releases the bolt into the adjacent notch.

It is one of the essential features of this invention to provide a crop guide bar assembly having spaced abutment areas and intervening passages so as to deflect a portion of the crops downwardly below the bar and to accommodate a substantial portion of the crops through the bar and in some instances around the ends of the bar to produce a well formed, airy swath with minimum voids and bunching.

It will be noted that preferred embodiments of the invention have been disclosed and that other modifications now will become readily apparent to those skilled in the art within the scope of the appended claims.

What is claimed is:

1. In combination with an ambulatory crop harvesting apparatus comprising crop-conditioning rollers oriented to discharge conditioned crops in a rearwardly directed relatively high velocity stream, crop aerating means having a position for impingement by said stream and comprising a plurality of vertically disposed fingers, said fingers having free lower ends for shedding toward the ground crops impinging against said fingers to form a first layer of a swath therebeneath, said fingers being spaced horizontally across said stream for accommodating passage therebetween of some crops in said stream to fall behind the fingers in another layer upon said first layer of crops.

2. The invention according to claim 1 and means mounting said crop aerating means from the harvester for free swinging movement about a substantially horizontal axis above said stream and behind said crop-conditioning rollers for accommodating varying volumes of material existing from said rollers.

3. The invention according to claim 2 and adjustable means for limiting the arc of movement of said crop aerating means.

4. The invention according to claim 2 and said crop aerating means comprising a generally horizontal bar mounting said fingers, and the fingers adjacent to at least one end of the bar being inclined inwardly downwardly from the respective end of said bar to guide the crops accordingly.

5. The invention according to claim 1 and windrow-forming means behind the crop aerating means comprising side panels adjustable laterally of the stream for controlling the width of said swath.

6. The invention according to claim 5 and said windrow-forming means having a top shield disposed athwart the stream of crops passing between the fingers for redirecting such crops downwardly onto said first layer while further fluffing such crops.

7. The invention according to claim 5 and said crop aerating means positioned between said rollers and said windrow-forming means.

8. The invention according to claim 1 and windrow-forming means behind said rollers for receiving said stream of crops, and said crop aerating means having another position displaced from said stream of crops entering into said windrow-forming means.

9. The invention according to claim 8 and said windrow-forming means comprising a top shield disposed in intercepting relation to said stream and said crop-aerating means disposed adjacent the rear edge of said top shield.

10. The invention according to claim 1 and said aerating means comprising a bar and said fingers removably mounted on the bar.

11. In a mower conditioner of the type having windrowing means and a pair of crop-crushing rollers discharging a stream of conditioned crops in an upward and rearward stream into said windrowing means, and aerating means for intercepting said stream and having tines raking through the stream for fluffing the same and directing a portion of the crops downwardly and accommodating the passage of a substantial portion of the crops therethrough to fall upon the ground therebehind.

12. The invention according to claim 11 and said aerating means disposed between the windrowing means and said rollers.

13. The invention according to claim 11 and said windrowing means comprising a top baffle providing a dispersal area in the path of said stream for redirecting the crops rearwardly, and said aerating means disposed behind said dispersal area in the path of movement of the crops from said dispersal area.

14. The invention according to claim 11 and said windrowing means comprising a top baffle disposed athwart said stream for impingement thereby in an area intermediate its ends and said aerating means disposed beneath said top baffle between said impingement area and said rollers.

15. In a harvester having means for conditioning crops and discharging them at a relatively high velocity in a directed stream, guide means positionable athwart said stream and comprising a plurality of fingers spaced transversely of the stream and providing areas of impingement for directing a portion of the stream downwardly and providing passage means between said fingers to accommodate flow of another portion of said material therethrough.

16. The invention according to claim 15 and said guide means oriented generally vertically, and shield means for closing selected portions of said passage means.

17. The invention according to claim 15 and shield means mounted for optionally blocking portions of said passage means.

18. The invention according to claim 15 and shield means mounted for optionally blocking the upper portions of said passage means.

19. The invention according to claim 15 and said guide means comprising a mounting bar, baffle means pivotally supported on the bar and swingable to a lowered position blocking portions of said passage means and to a raised position opening said passage means.

20. A harvester having means for conditioning crops and accelerating them to flow in a wide band trajectory above the ground, means for forming the crops into a predetermined formation upon the ground comprising a structure including a plurality of laterally spaced fingers having a lowered position intercepting said band of material and providing limited impingement areas for decelerating the impinging crops and directing them groundwardly, said fingers defining passage means therebetween accommodating flow of the remainder of the crop through the fingers in a free fall trajectory to the ground.

21. The invention according to claim 20 and said structure having an inoperative raised position and intermediate positions between the raised and lowered positions for variably controlling the flow of the crops.

22. The invention according to claim 20 and adjustable means for converging the crops extending beneath said forming means and operative to selectively narrow and broaden the width of the formation upon the ground attendant to predetermined positioning of said structure.

23. The invention according to claim 20 and said adjustable means disposed at opposite sides of said band and comprising material guiding surfaces beneath the band positionably in converging relation toward each other, said surfaces located in a region behind said forming means.

24. The invention according to claim 20 and said fingers at opposite ends of the forming means being angled inwardly toward each other.

25. The invention according to claim 20 and the fingers at opposite ends of said forming means being angled toward said conditioning means.

* * * * *